June 22, 1948.　　　　T. McDANIEL, JR　　　　2,443,830
METHOD OF ASSEMBLING THE POWER
SECTION OF RADIAL ENGINES
Filed Nov. 4, 1943　　　　　　　　　　　　6 Sheets-Sheet 1
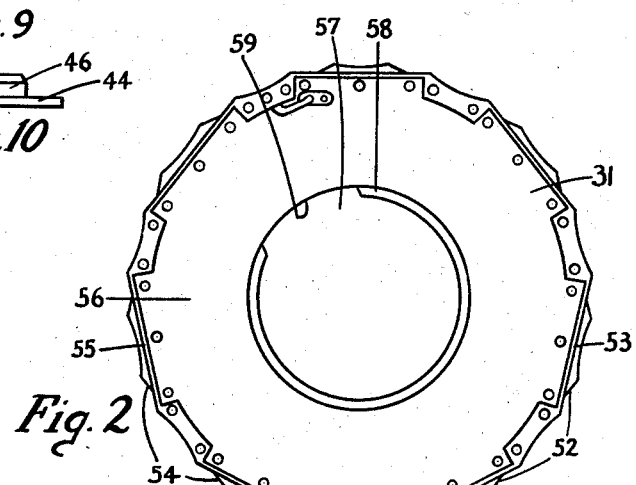
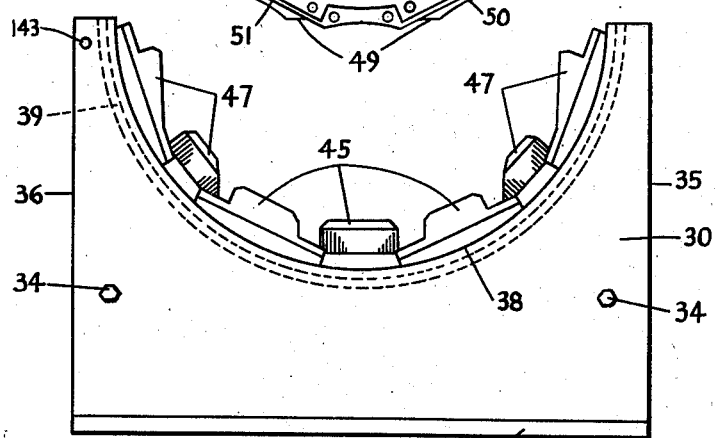
INVENTOR.
Thomas McDaniel, Jr.
BY
ATTORNEY June 22, 1948.
T. McDANIEL, JR
METHOD OF ASSEMBLING THE POWER
SECTION OF RADIAL ENGINES
2,443,830
Filed Nov. 4, 1943
6 Sheets-Sheet 2
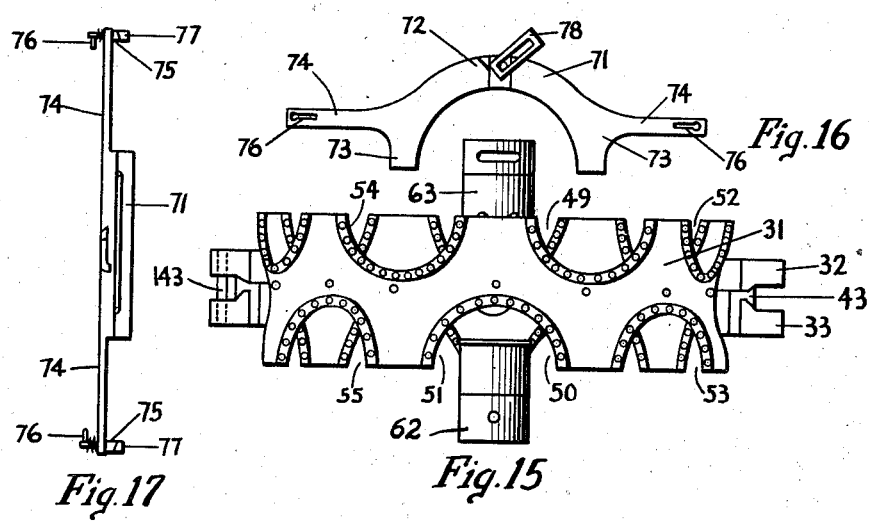
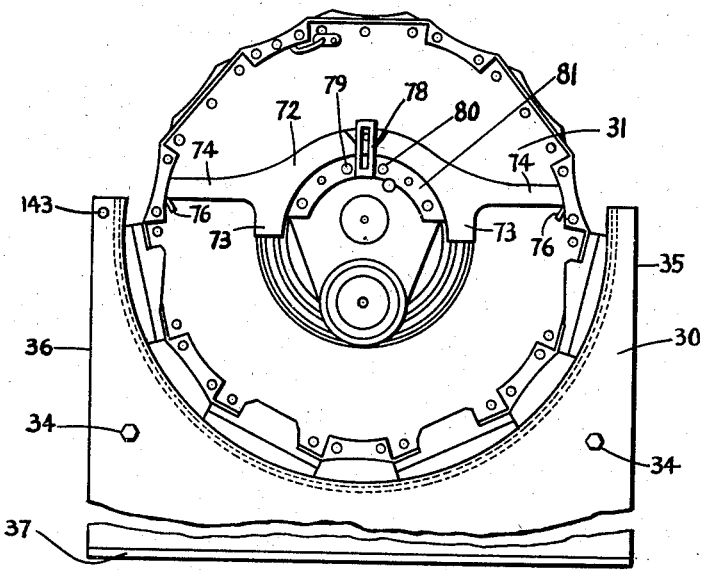
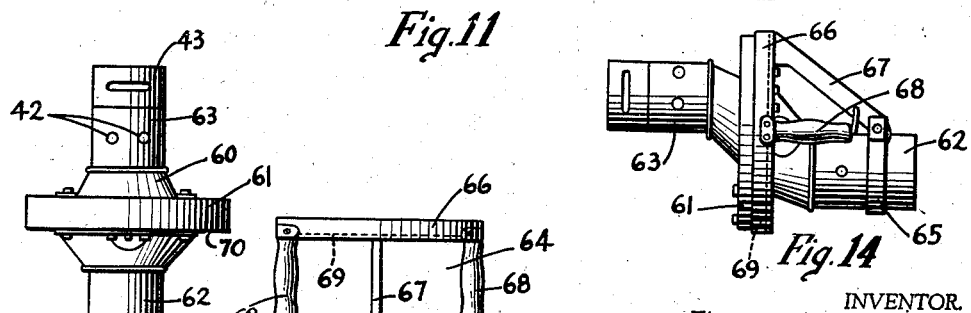
INVENTOR.
Thomas McDaniel, Jr.
BY
ATTORNEY

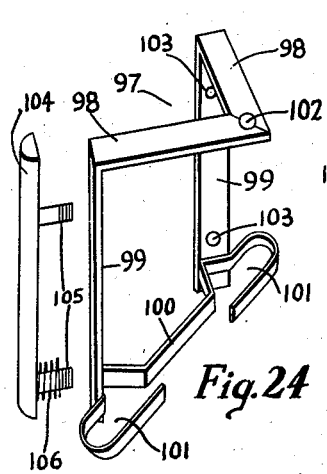
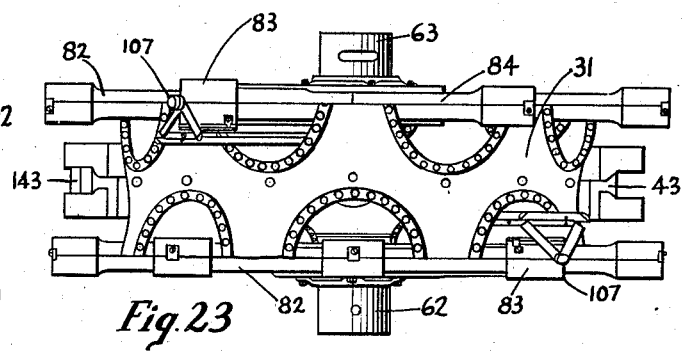
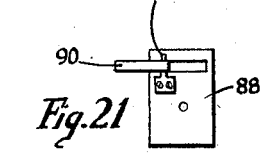
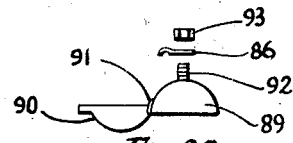
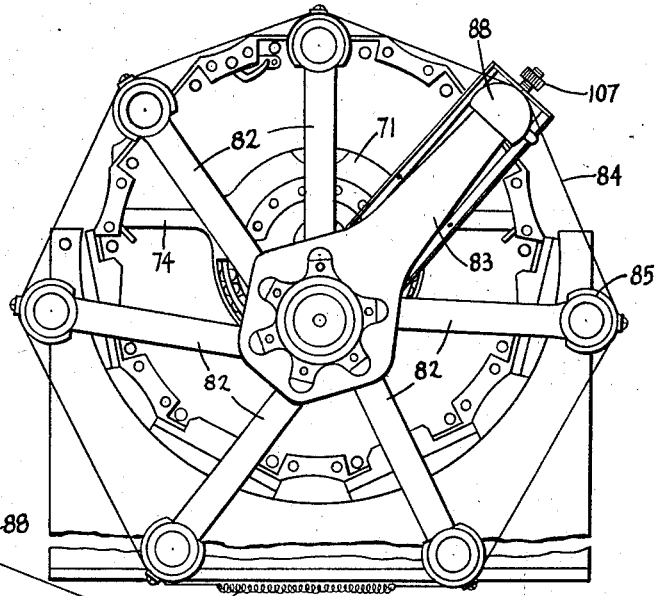
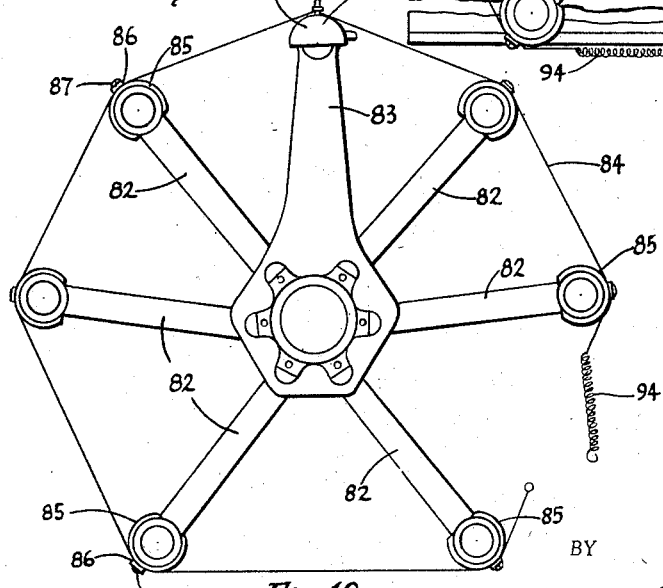
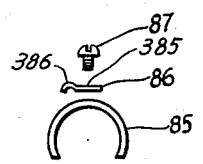

June 22, 1948.  T. McDANIEL, JR  2,443,830
METHOD OF ASSEMBLING THE POWER
SECTION OF RADIAL ENGINES
Filed Nov. 4, 1943  6 Sheets-Sheet 6
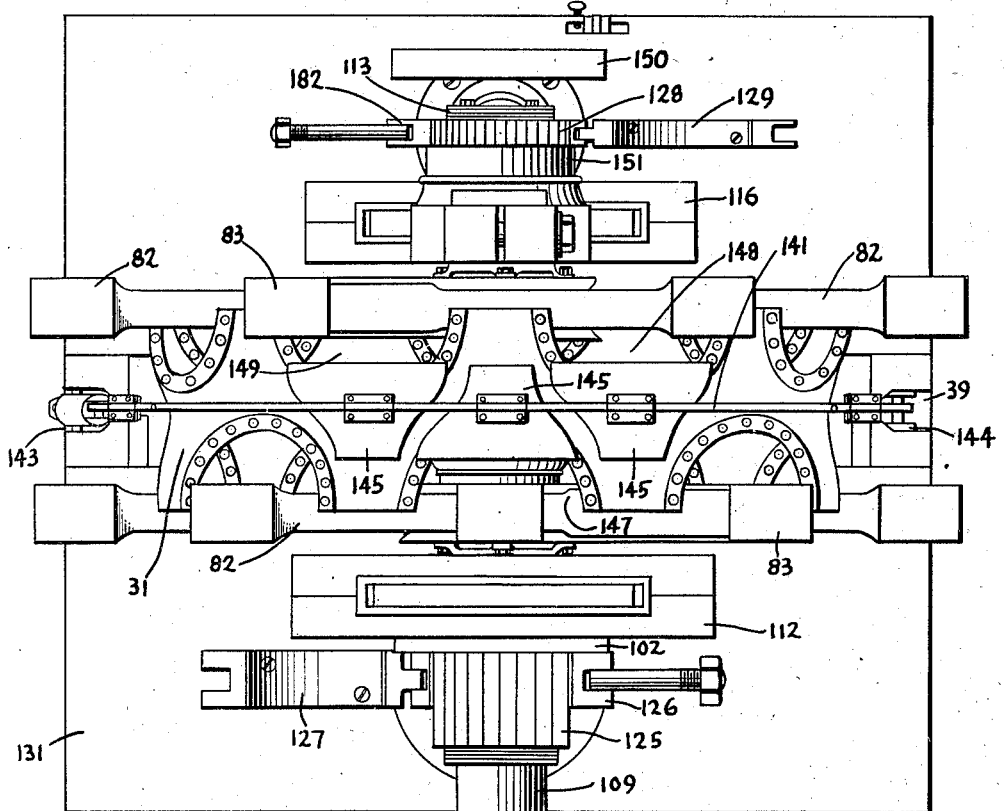
INVENTOR.
Thomas McDaniel, Jr.
BY
ATTORNEY Patented June 22, 1948

2,443,830

UNITED STATES PATENT OFFICE 2,443,830

METHOD OF ASSEMBLING THE POWER SECTION OF RADIAL ENGINES

Thomas McDaniel, Jr., Cincinnati, Ohio

Application November 4, 1943, Serial No. 508,992

7 Claims. (Cl. 29—156.4)

This invention relates to a method of assembling the power section of internal combustion engines of the radial type.

An object of the invention is to provide a simple, highly effective method for simultaneously aligning the front and rear crank shaft assemblies with reference to the front and rear cranks of the crankshaft of an internal combustion engine of the radial type characterized by a double bank of cylinders.

Another object of the invention is to teach a new and novel method of assembling the power section of an internal combustion engine of the radial type.

These and other objects are attained by the means described herein, and disclosed in the accompanying drawings in which:

Fig. 1 is a front end view of an engine supporting cradle comprising a detail of the present invention.

Fig. 2 is a front view of the center crankcase section of a radial engine.

Fig. 3 is a top view of the cradle of Fig. 1.

Fig. 4 is a top view of an adjustable adapter for a crankcase holding pad.

Fig. 5 is a side view of the adapter of Fig. 4.

Fig. 6 is an end view of the adapter of Fig. 4.

Fig. 7 is a top view of one form of crankcase holding pad which comprises a detail of the invention.

Fig. 8 is a side view of the pad of Fig. 7.

Fig. 9 is a top view of another form of crankcase holding pad.

Fig. 10 is a side view of the pad of Fig. 9.

Fig. 11 is a front end view of the cradle of Fig. 1 with the center crankcase section of Fig. 2 mounted therein.

Fig. 12 is a top view of the center section of the crankshaft of a radial engine.

Fig. 13 is a top view of a center crankshaft handling tool which comprises a detail of the present invention.

Fig. 14 is a side view of the crankshaft of Fig. 12 mounted in the tool of Fig. 13.

Fig. 15 is a top view of Fig. 11.

Fig. 16 is a front view of a center crankshaft retaining tool which comprises a detail of the present invention.

Fig. 17 is a top view of the tool of Fig. 16.

Fig. 18 is an end view of a connector rod assembly wherein the master and various articulating rods are yieldingly held in an extended position by means of a rod spacing tool which comprises a detail of the invention.

Fig. 19 is a separated view of the component parts of an articulate rod clamp.

Fig. 20 is an end view, partially separated, of a master rod clamp.

Fig. 21 is a top view of the clamp of Fig. 20.

Fig. 22 is a view similar to Fig. 11 but with the rod assembly of Fig. 18 mounted on the forward crank of the crankshaft.

Fig. 23 is a top view of Fig. 22.

Fig. 24 is a perspective view of a master rod stabilizing tool comprising a detail of the invention.

Fig. 28 is a top view of Fig. 26 but with the forward and rear crankshaft clamps released, and showing the rear main bearing, and the front and rear crankcases ready to be mounted to the engine.

Fig. 29 is a separated view of an engine hold-down tool comprising a detail of the invention.

Figures 25, 26:
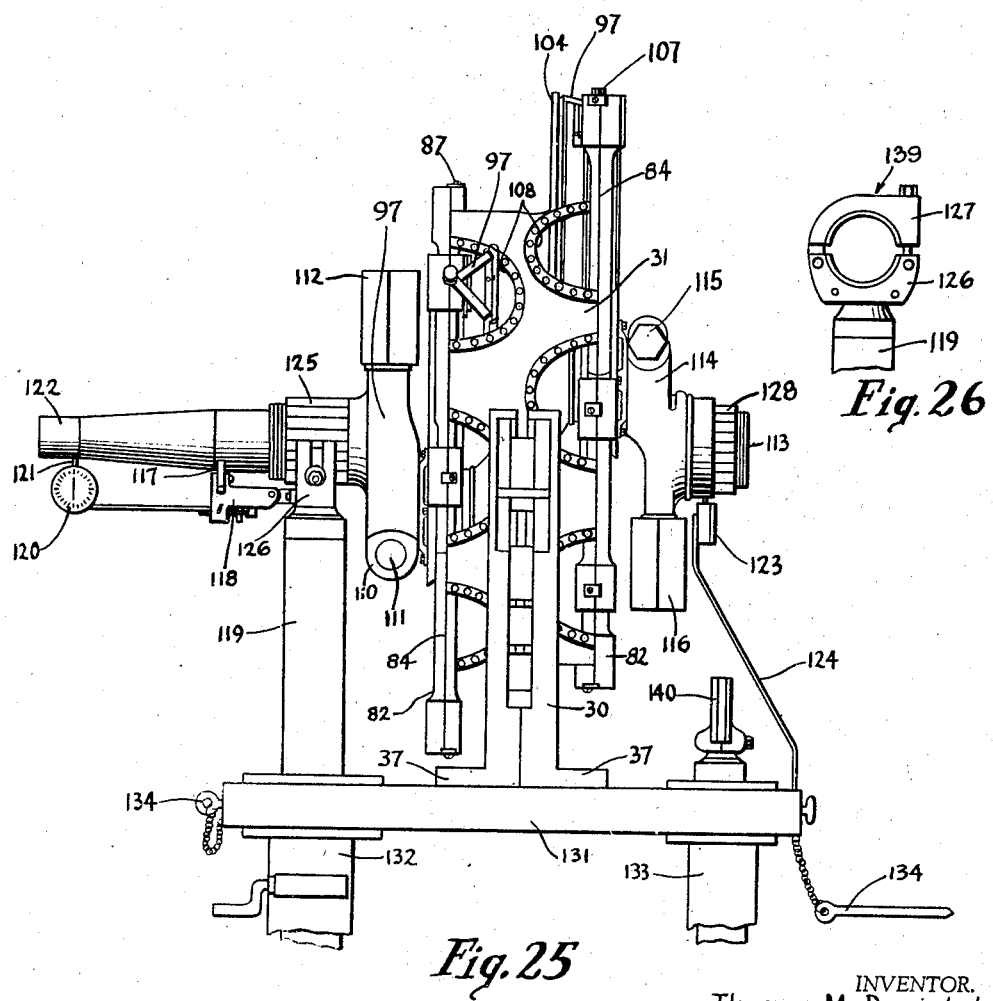
Fig. 25 is a right side view of the engine assembly of Fig. 22, but with the front and rear crankshafts mounted onto the center crankshaft and ready to be checked for axial alignment.
Fig. 26 is a side view of a crankshaft engaging clamp.

Heretofore the power section of internal combustion engines of the radial type have been assembled around the crankshaft, the opposite ends of which have been alternately mounted in holding fixtures for facilitating assemblage of parts onto the free, or unheld end. Such procedure entailed a considerable amount of unnecessary handling of the engine being assembled with the result that highly skilled mechanics were required for the job.

In sharp contrast to the methods and apparatus now used, my method and apparatus enable unskilled or semi-skilled labor to be used in lieu of the high priced, highly skilled labor heretofore required, and in addition thereto the rate of production may be increased elevenfold while the accuracy of the crankshaft bearing alignment is materially increased.

For clarity of detail and understanding the present invention will be explained in terms of the procedure followed in fabricating the power section of an internal combustion engine of the radial type.

With reference to Figs. 1 and 2 the numeral 30 denotes a cradle or holding fixture for the central section 31 of the crankcase of a radial engine. The cradle may comprise a pair of complementary sections 32 and 33 secured together by means of bolts 34, and wherein each section includes opposed side edges 35 and 36, and outturned foot portion 37 and an arcuate upper edge 38. A dovetail shaped slot 39, having a restricted throat portion 40, is provided between the adjacent faces of sections 32 and 33 and in spaced parallelism with arcuate edge 38. The upper end of throat portion 40 is in open communication with edge 38 for facilitating attachment of adapter members 41 relative to arcuate edge 38.

As disclosed in Figs. 5 and 6, the adapter members comprise a body portion 42 and an arcuately shaped key element 43 which is complementary to and adapted to slideably engage the dovetail slot 39.

Each adapter member is adapted to locate a central crankcase holding pad 44 or 45, relative to arcuate edge 38 of the cradle for engaging certain of the cylinder base openings provided in the lower or underside of the central section of the crankcase. Each pad includes an outwardly projecting rim or lip 46 (Fig. 9) or a partial rim or lip 47 (Fig. 7), which are adapted to fit or extend into the cylinder base openings, as hereinafter more fully explained. The pads may be secured to their respective adapters by means of bolts, rivets or the like denoted generally by the numeral 48 (Fig. 3). Each pad and its associated adapter may be fastened or locked relative to the periphery of edge 38 by means of locking screws 490, the lower ends of which engage edge 38. By loosening locking screws 490, the relative position of the various pads and their respective adapters may be shifted along arcuate edge 38, for accommodating the different spacing of the cylinder base openings of various radial engines.

The central section 31 of the crankcase of a radial engine comprises a double row of staggered, semi-circular cylinder base openings 49, disposed around the outer periphery of the case, as best illustrated in Fig. 15. The central crankcase holding pads 44, having full rims or lips 46, are aligned relative to arcuate edge 38 of the cradle whereby to engage cylinder base openings 49, 50 and 51 (Fig. 15) whereas pads 45, having partial lips or rims 47, are aligned to engage cylinder base openings 52, 53, 54, 55, when the crankcase is lowered vertically from the position of Fig. 2 into fixture 30, whereby to assume the position indicated in Fig. 11.

The crankcase will be securely positioned in cradle 30 by its own weight and by the interaction between pads 44 and 45 and their respective cylinder base openings.

As disclosed in Fig. 2, the central section of the crankcase is laterally divided by means of a central web 56, having a center crankshaft main bearing opening 57 disposed therethrough. A central main bearing race retainer lip 58 is provided around most of the periphery of opening 57 in such a manner as to provide a rear crank clearance space 59.

The next step in the engine assemblage is to mount the central crankshaft 60 and the central main bearing 61 in crankcase 31. As disclosed in Fig. 12 the central crankshaft comprises a forward crank portion 62 and a rear crank portion 63. The crankshaft may be lifted into place by means of the tool 64 illustrated in Figs. 13 and 14, which comprises a front crank engaging loop 65, a main bearing engaging loop 66, a connector element 67, and a pair of handles 68. The main bearing engaging loop preferably includes a depending lip 69 which is adapted to abut against forward face 70 of center main bearing 61 for determining the relative position of the tool on the bearing. By lifting on handles 68 one operator may lift the crankshaft and insert the rear crank portion 63 through web opening 57 and align the central main bearing 61 relative to its seat until it abuts against lip 58. The cut away clearance space 59 facilitates insertion of the rear crank into the crankcase opening. After the center crankshaft has thus been mounted in the crankcase, tool 64 may be removed from the crankshaft and crankshaft locking tool 71 applied thereto.

The locking tool 71 comprises an arcuate central portion 72 which is adapted to fit over the upper portion of the central main bearing 61, and a pair of downwardly projecting legs 73 which engage the forward face of the inner race of the main bearing of the central crankshaft, and a pair of outwardly extending arms 74. The outer end of each of the arms 74 terminates in locking lugs 75 which are adapted to be inserted into a breather hole of crankcase 31 and then be turned by means of actuator handle 76 whereby the eccentric end 77 will engage the rear face of the crankcase for securely locking the tool and center crankshaft in the position disclosed in Fig. 11.

The crankshaft may now be secured against rotation relative to crankcase 31 by means of latch member 78 pivotally secured to the apex of the central portion of tool 71. Member 78 is preferably dimensioned so as to snugly fit between a pair of cap screws 79 and 80 threaded into the main bearing support or locking plate 81. The crankshaft has now been securely mounted relative to the central crankcase with the front and rear crank portion 62 and 63 respectively projecting from opposite sides thereof, as illustrated in Fig. 15.

The front and rear crank rod assemblies may now be mounted on the front and rear cranks of the central crankshaft. In order to facilitate ease of assembly and mounting the rod assemblies, means are provided for releasably holding the various articulating rods 82 in extended position relative to each other and to the master rod 83. Such means may comprise a flexible connector formed of wire, rope, chain, or the like, denoted generally by the numeral 84, and a plurality of adjustable clamps 85 which are adjustably secured to the flexible connector by means of plate 86 and screw 87. As illustrated in Fig. 19, plate 86 includes a flat portion 385 and a half rounded portion 386. The rounded portion is adapted to clampingly engage the flexible connector 84 and wedge it against the outer face of clamp 85 when screw 87, which extends through portion 385, is threaded into clamp 85. In this manner the various clamps 85 are securely, though releasably, fastened to connector member 84. Each clamp 85 is adapted to engage the outer or wrist pin end of an articulating rod, whereas a master clamp 88 is adapted to engage the outer end of the master rod. As illustrated in Figs. 20 and 21 the master clamp 88 comprises an inverted U-shaped housing having one end, 89, closed and with the other end open to facilitate endwise sliding of said housing onto the outer end of the master rod. The open end of the housing may be closed by means of a hinged locking gate 90 pivotally secured as at 91 to the housing. A threaded stud 92 is secured to and carried by housing 89, said stud adapted to receive plate 86 and nut 93. It will be observed that once the various clamps have been locked to flexible connector 84 at a desired connector rod spacing for a given engine, they will thereafter space the rods of all subsequent assemblies in exactly the same manner. A spring 94 is preferably provided between the opposite ends of the flexible connector, for a purpose hereinafter more fully explained.

An extended rod assembly, arranged as illustrated in Fig. 18, may be lifted, for mounting the assembly on the forward or rear cranks of the center crankshaft, by grasping the master rod intermediate its length. The flexible connector will maintain the various rods in their preselected extended relationship, as each rod is located within its respective cylinder base opening.

In order to more accurately locate the outer ends of the various articulator rods 82 relative to the cylinder base openings and to facilitate their reciprocatory action as the forward and rear crankshafts 109 and 113 are run in, a master rod stabilizing tool 97 (Fig. 24) may be utilized for aligning the master rod of a rod assembly relative to its respective cylinder base opening. This tool may be fabricated from a length of strap material formed to provide a pair of divergent legs 98 disposed in a common plane and a pair of downwardly depending legs 99. A cross strap 100 is provided between and interconnects the lower ends of legs 99. The ends of said strap are bent whereby to provide a pair of inturned hook-like members 101. Each depending leg 99 may include a pair of spaced stud receptive apertures 103 whereas a stud receptive aperture 102 is provided through the apex of divergent legs 98. A pair of half round bearing bars 104 are provided, each bar including a pair of outwardly projecting studs 105 which are adapted to be inserted into apertures 103 of legs 99. A spring 106 may be provided on studs 105 for normally urging the bearing bars away from their respective legs 99. Accidental and/or unintentional withdrawal of studs 105 from their respective apertures may be precluded by threading a nut, not illustrated, onto the outer ends of the studs which project through the apertures in legs 99.

Figure 27:
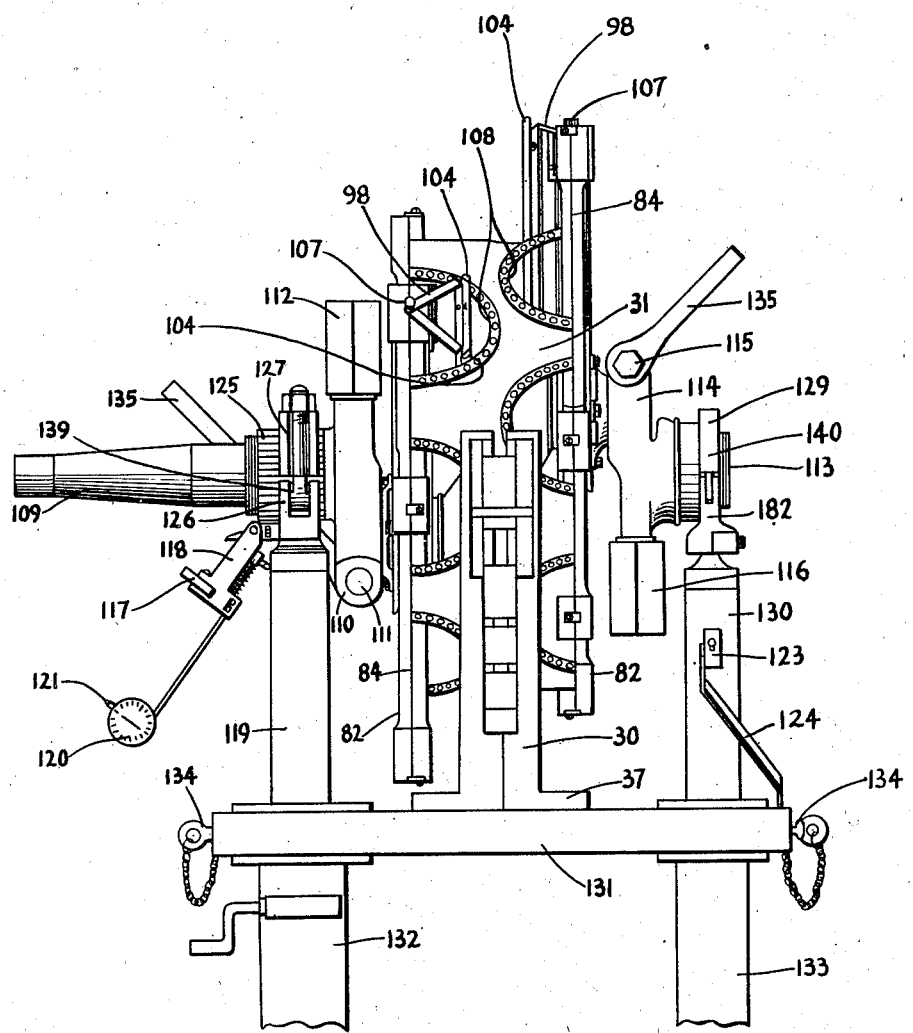
Fig. 27 is a view similar to Fig. 25 but with the dial gauges released and with the front and rear crankshafts clamped for tightening of said crankshafts on and relative to the center crankshaft.

Tool 97 is adapted to be lowered onto and over the master rod whereby the hook members 101 will engage the opposite side edges of the rod and wherein stud 92 of the master rod bearing clamp 89 will project upwardly through aperture 102 after which a nut 107 may be applied for securely, though releasably attaching the tool to the master rod. As best illustrated in Figs. 25 and 27 bearing bars 104 are adapted to abut against the periphery of cylinder base 108. It should be understood that a duplicate rod assembly will be provided for the front and rear cranks, and that the master rod of each assembly will be provided with a stabilizing tool 97.

The forward crankshaft assembly, comprising forward crankshaft 109, split yoke 110, and counterbalance 112, may be secured to the forward crank portion 62 of the center crankshaft. The rear crankshaft assembly, comprising rear crankshaft 113, split yoke 114, and counterbalance 116, may be secured to the rear crank portion 63 of the center crankshaft, in a manner well known in the art. Cap screws 111 and 115 may then be snugged down to facilitate alignment of the front and rear crankshafts.

A steady rest, comprising a pair of rollers 117 secured to and carrier by an arm 118, which in turn is secured to and carried by a vertically adjustable post 119, may be disposed beneath the overhanging portion of the forward crankshaft, and a dial gage 120 including a crankshaft contactor pin 121 may be operatively associated with the forward end 122 of the crankshaft. The forward crankshaft is thus mounted for rotation, however, before rotation may be effected it is first necessary to withdraw latch member 78 of locking tool 71 from its interfering relationship with cap screws 79 and 80. The latch may be returned to the inoperative position indicated in Fig. 16. The crankshaft may now be rotated for axial alignment, and if the alignment is not within predetermined allowable limits, the crankshaft may be adjusted on and relative to its crank portion of the center crankshaft. It will be observed that the various rods of the front and rear rod assemblies will reciprocate each within their associated cylinder base opening incident to rotation of the crankshaft. Flexible connectors 84, springs 94, and the master rod stabilizing tools 97 cooperate in such a manner as to guide the free outer or wrist pin end of the various rods in substantially the same path they would describe if and when connected to their respective pistons.

In a similar manner the rear crankshaft is aligned relative to a true axis of rotation by means of dial gage 123 suitably positioned by means of a support rod 124.

After the front and rear crankshafts have thus been aligned, the dial gages 120 and 123 are moved to an inoperative position, the steady rest is lowered and the splined portion 125 is securely, though releasably engaged between jaws 126 and 127 of a two piece clamp 139 (Fig. 26) secured to and carried by the upper end of post 119 (Fig. 27). The splined end 128 of the rear crankshaft is likewise engaged between jaws 182 and 129 of the two piece clamp 140, secured to and carried by the upper end of post 130. It will be understood that any suitable means may be provided for facilitating raising and lowering of posts 119 and 130, such as, by way of example, is disclosed in Figs. 25 and 26, wherein the crankcase cradle 30 is mounted upon an elevated platform 131 supported on legs 132 and 133. Posts 119 and 130 may telescopically engage legs 132 and 133 respectively, being maintained in extended condition by means of pins 134 which are insertable into apertures provided in and spaced along the length dimension of said posts.

After the clamps have thus been secured to splined portions 125 and 128 of the front and rear crankshafts respectively, capscrews 111 and 115 may be tightened by means of wrenches 135, for locking said crankshafts to the center crankshaft. Clamps 139 and 140 may now be released and supporting post 130 lowered for disposing it in a non-obstructing position. The steady rest 118 may then be moved to a front crankshaft supporting position and dial gage 120 associated with end 122 thereof, after which the crankshaft is rotated and rechecked for axial alignment. If the alignment is proper support post 119 may be lowered, however if the crankshaft is out of alignment the rear post 130 is raised, clamps 139 and 140 applied, cap screws 111 and 115 loosened and the aligning procedure repeated.

It should be noted that thus far the engine being built has been supported solely by means of cradle 30 in which it has been held secure by reason of its inherent weight. At this point in the engine assembly it is preferable, though not essential, that center crankcase 31 be locked, or otherwise positively secured to the cradle, before the front and rear crankcases are assembled. This may be expeditiously accomplished by means of the clamping means, denoted generally by the numeral 141 (Figs. 28 and 29), which comprises a length of cable 142, or the like, one end of which is pivotally secured to pin 143 of cradle 30 and the opposite end of which terminates in a cam member 144, including a hand grip portion 451. A plurality of holding pads 145, each including an outwardly projecting arcuate lip 146, are secured to and carried by cable 142, said pads being laterally spaced by a dimension equal to the spacing of the cylinder base openings. Arcuate lips 146 are adapted to engage a portion of the periphery of type cylinder base openings 147, 148 and 149 when cam 144 is associated with and locked relative to arcuate slot 39.

After the engine assembly has thus been made fast to cradle 30, the master rod stabilizing tools 97 may be removed along with the rod holding means 89.

The rear main bearing outer race and roller retainer 150 may be slipped over the rear main bearing inner raceway 151 (Fig. 28), after which the front and rear crankcases 152 and 153 respectively, may be assembled. Tool 71 may be removed through the cylinder base openings, after the crankshaft assembly has been secured against accidental or unintentional removal from the engine.

The following sequence of operations may then be performed in order to complete assembly of the power section, to wit: The rear cam drive gear may be installed and the valves timed, after which the rear crankshaft cam gear thrust nut, locking screw and cotter pin (not illustrated) may be added, after which the following parts may be installed: tail shaft drive gear, spring and locking ring; front super charger housing; rear section of engine including supercharger, accessory drive, oil pump and kindred items; front oil seal retainer; bull gear, after which the engine may be timed; bull gear thrust nut; nose section including propeller shaft; nose section wiring ring. The motor hold down clamping means 141 may now be released and the top five pistons and their associated rings installed in the top five cylinder openings. The top cylinders may then be installed, followed by the push and rocker arm assemblies and baffles. The engine may then be timed and the magnetos installed on the rear section followed by the installation of the exhaust and intake manifolds for the top five cylinders. The engine may then be lifted, the oil sump attached and the bottom nine cylinders installed.

It will be understood that the parts enumerated in the preceding paragraph are standard and have been referred to solely for the purpose of indicating to those skilled in the art the part which my method and apparatus plays in the assembly of a radial engine.

From the foregoing it will be observed that I have provided a simplified method of assembling an internal combustion engine of the radial type as well as apparatus for practicing said method. It will be understood that the fixture may be portable or fixed, without effecting its efficiency, depending upon the circumstances under which it is to be used.

The hereinabove described method of assembling a radial engine makes it possible, for the first time, to efficiently utilize semi or unskilled labor, since both ends of the center crankshaft are always freely accessible, thereby enabling an operator to do but one or two operations as his contribution toward assemblage of the engine. This is in sharp contrast to the methods currently employed wherein a few highly skilled mechanics build, or assemble an entire engine. Where formerly five skilled mechanics required 7½ hours to assemble five radial engines, using my method five unskilled mechanics can assemble six radial engines in but 40 minutes. In other words, 66 engines can be assembled where five are now assembled.

Another decided advantage of my method over those currently used relates to the problem of aligning the front and rear crankshafts. The present method of pre-aligning the front and rear crankshafts relative to the center crankshaft using lining bars may be dispensed with and the front and rear crankshafts may now be simultaneously aligned with dial gages, thereby insuring more accurate alignment than heretofore possible. This may be done since the front and rear crankshafts are both exposed and easily accessible at the same time, see Figs. 15, 23, 25 and 27.

It will be observed that in those instances when dial gages are not available for checking the axial alignment of the front and rear crankshafts 109 and 113 respectively, it is, nevertheless, possible to quite accurately align the front and rear crankshafts in the following manner. After the front and rear crankshafts have been mounted and snugged onto the front and rear cranks of the center crankshaft 60, the front and rear crankcases may be mounted over the front and rear crankshafts and secured to the center crankcase. During this procedure the front and rear crankshafts may be aligned relative to the main bearing retainers of the front, center and rear crankcases, after which said crankcases may be removed without disturbing the axial alignment of the now aligned front and rear crankshafts. Cap screws 111 and 115 may now be tightened for locking the front and rear crankshafts in their axially aligned position relative to the center crankshaft. The front and rear crankcases may then be re-assembled for completing the crankcase assembly. It will be understood that the front and rear connector rod assemblies will be associated with their respective front and rear cranks of the center crankshaft before the front and rear crankcases are assembled.

It should be noted that certain modifications and changes in the structural details of the devices may be made, within the scope of the appended claims, without departing from the spirit of the invention.

What is claimed is:

1. The method of assembling the power section of an internal combustion engine of the radial type which is characterized by a double bank of cylinders, and which includes a three piece crankshaft comprising front, center and rear portions, and a three piece crankcase comprising front, center and rear portions, which method comprises the steps of securing the center crankcase portion in an upstanding position, of mounting the center crankshaft in the center crankcase with the front and rear cranks thereof projecting outwardly from the respective front and rear faces of said crankcase, of mounting the front and rear connector rod assemblies onto the front and rear cranks respectively, of mounting the front and rear crankshafts onto the front and rear cranks of the center crankshaft respectively, and of then mounting the front and rear crankcases over and in housing relationship with their respective crank shafts and in abutting relationship with said center crank case for completing the crankcase assembly.

2. The method of assembling the power section of an internal combustion engine of the radial type which is characterized by a double bank of cylinders, and which includes a three element crankshaft comprising front, center and rear portions, and a three element crankcase comprising front, center and rear portions, which method comprises the steps of securing the center crankcase in an upstanding position, of mounting the center crankshaft in the center crankcase whereby the front and rear cranks thereof project outwardly from the front and rear faces respectively of said crankcase, of mounting the front and rear connecting rod assemblies onto the front and rear cranks, of mounting the front and rear crankshafts onto the front and rear cranks of the center crankshaft, of simultaneously checking the axial alignment of the front and rear crankshafts, of adjusting said crankshafts for correct axial alignment, of locking the axially aligned front and rear crankshafts to the central crankshaft, and of then mounting the front and rear crankcases over their respective crankshafts and onto the center crankcase for completing the crankcase assembly.

3. The method of axially aligning the front and rear crankshafts of an internal combustion engine of the radial type which is characterized by a double bank of cylinders, and which includes a three element crankshaft comprising front, center and rear portions, and a three element crankcase comprising front, center and rear portions, which method includes the steps of mounting the center crankshaft in the center crankcase, of mounting the front and rear connector rod assemblies onto the front and rear cranks of the center crankshaft, of mounting and snugging the front and rear crankshafts onto the front and rear cranks of the center crankshaft, of mounting the front and rear crankcases over the front and rear crankshafts, of aligning said front and rear crankshafts relative to their respective crankcases as said crankcases are mounted onto the center crankcase, of removing said front and rear crankcases without disturbing the axial alignment of the front and rear crankshafts, of then locking said axially aligned crankshafts relative to said center crankshaft, and of then replacing said front and rear crankcases for completing the assembly.

4. The method of assembling the power section of an internal combustion engine of the type which is characterized by a double bank of cylinders, and which includes a three element crankshaft comprising front, center and rear portions, and a three element crankcase which comprises front, center and rear portions, which method comprises the steps of securing the center crankcase in an upstanding position, of mounting the center crankshaft in the center crankcase whereby the front and rear cranks of said crankshaft will extend outwardly of and be freely and simultaneously accessible from the respective front and rear sides of the center crankcase, of securing said center crankshaft to the center crankcase against accidental or unintentional displacement therefrom, of mounting the front and rear connector rod assemblies with the various articulating and master rods in extended positions onto the front and rear cranks respectively whereby each of said rods will be spaced apart by a dimension corresponding to the spacing of the cylinder base openings of the crankcase, of mounting and snugging the front and rear crankshafts onto the front and rear cranks of the center crankshaft, of aligning the master rod of each connector rod assembly relative to its respective cylinder base opening in the center crankcase and for guiding said rod and the articulating rods of the assembly relative to their respective cylinder base openings as their respective crankshaft is rotated for purposes of alignment, of simultaneously checking the axial alignment of the front and rear crankshafts, of locking said axially aligned crankshafts relative to the center crankshaft, and of then mounting the front and rear crankcases over their respective crankshafts and onto the center crankcase for completing the crankcase assembly.

5. The method of axially aligning the front and rear crankshafts of an internal combustion engine of the radial type which is characterized by a double bank of cylinders, and which includes a three element crankshaft comprising front, center and rear portions, and a three element crankcase comprising front, center and rear portions, which method includes the steps of mounting the center crankshaft in the center crankcase, of mounting the front and rear connector rod assemblies onto the front and rear cranks of the center crankshaft, of mounting and snugging the front and rear crankshafts onto the front and rear cranks of the center crankshaft, of mounting the front and rear crankcases over the front and rear crankshafts, of aligning said composite crankshaft by rotating the front and rear elements thereof relative to their respective crank cases, of removing said front and rear crankcases without disturbing the axial alignment of the front and rear crankshafts, of then locking said axially aligned crankshafts relative to said center crankshaft, and of then replacing said front and rear crankcases for completing the assembly.

6. The method of assembling the power section of an internal combustion engine of the radial type which is characterized by a double bank of cylinders, and which includes a three piece crankshaft comprising front, center and rear portions, and a three piece crankcase comprising front, center and rear portions, which method comprises the steps of securing the center crankcase portion in an upstanding position, of mounting the center crankshaft in the center crankcase with the front and rear cranks thereof projecting outwardly from the respective front and rear faces of said crankcase, of mounting the front and rear connector rod assemblies onto the front and rear cranks respectively, of mounting the front and rear crankshafts onto the front and rear cranks of the center crankshaft respectively, of aligning said composite crankshaft by rotating the front and rear elements thereof relative to the center portion thereof, of locking said front and rear crankshafts to said central portion, and of then mounting the front and rear crankcases over and in housing relationship with their respective crankshafts and in abutting relationship with said center crankcasing for completing the crankcase assembly.

7. The method of assembling the power section of an internal combustion engine of the radial type which is characterized by a double bank of cylinders, and which includes a three element crankshaft assembly comprising a central crankshaft having front and rear crank portions and front and rear crankshafts mountable upon said crank portions, and a three element crankcase comprising front, center and rear elements wherein each element has a main bearing receptive opening therethrough, which method comprises the steps of securing the center crankcase in an upstanding position, of mounting the center crankshaft including its main bearing in the bearing receptive opening of the central crankcase with its front and rear crank portions projecting outwardly from the front and rear faces respectively of said crankcase, of mounting the front and rear connecting rod assembly onto the front and rear cranks respectively, of then mounting the front and rear crankshafts onto the front and rear portions of said center crankshaft, of aligning the three element crankshaft by rotating the front and rear crankshafts with and relative to the center shaft, of then mounting the front and rear crankcases over their respective front and rear crankshafts for completing the crankcase assembly.

THOMAS McDANIEL, Jr.

REFERENCES CITED

The following references are of record in the file of this patent:

UNITED STATES PATENTS

| Number | Name | Date |
|---|---|---|
| 127,837 | Benson | June 11, 1872 |
| 1,065,979 | Spencer | July 1, 1913 |
| 1,114,554 | Utz | Oct. 20, 1914 |
| 1,196,884 | Patterson | Sept. 5, 1916 |
| 1,232,527 | Gemmill | July 10, 1917 |
| 1,986,237 | Widmann | Jan. 1, 1935 |
| 2,087,626 | Minshall | July 20, 1937 |
| 2,119,104 | Hirth | May 31, 1938 |
| 2,232,682 | Larson | Feb. 25, 1941 |